United States Patent [19]

Nogami et al.

[11] Patent Number: 4,895,284
[45] Date of Patent: Jan. 23, 1990

[54] CRASH HELMET STORAGE DEVICE FOR MOTORCYCLES

[75] Inventors: Yoshio Nogami, Okayama; Yoshihiro Matsuo, Saitama; Takayuki Fujii, Saitama; Seiichi Urashi, Saitama, all of Japan

[73] Assignee: Honda Giken Kogyo Kabushiki Kaisha, Tokyo, Japan

[21] Appl. No.: 222,147

[22] Filed: Jul. 21, 1988

[30] Foreign Application Priority Data

Jul. 22, 1987 [JP] Japan ............... 62-180994

[51] Int. Cl.⁴ ............................................... B62J 7/00
[52] U.S. Cl. ............................... 224/32 R; 296/37.1
[58] Field of Search ............... 224/30 A, 36, 32 R, 224/42, 42 R, 282; 280/289 A, 769; 296/37.1, 78.1

[56] References Cited

U.S. PATENT DOCUMENTS

| | | | |
|---|---|---|---|
| 2,401,245 | 5/1946 | Hobbs | 224/36 X |
| 3,837,545 | 9/1974 | Rogers, Jr. | 224/32 R X |
| 4,522,442 | 6/1985 | Takemaka | 296/37.1 |
| 4,564,081 | 1/1986 | Hamane et al. | 280/289 A X |
| 4,700,799 | 10/1987 | Kawano | 180/219 |
| 4,723,620 | 2/1988 | Ono | 180/219 |

FOREIGN PATENT DOCUMENTS 2397315 6/1980 France .
59-192481 12/1984 Japan .

Primary Examiner—Renee S. Luebke
Attorney, Agent, or Firm—Irving M. Weiner; Joseph P. Carrier; Pamela S. Burt

[57] ABSTRACT

A crash helmet storage device in a motorcycle having a front cowl having a portion covering at least an area in front of a handlebar of the motorcycle. The crash helmet storage device comprises a receptacle disposed in the front cowl and having an open front side, a front cover serving as a component of the front cowl and positioned in front of the receptacle, and a pair of side covers serving as other components of the front cowl and covering lateral sides of the receptacle. The front cover is separate from the side covers and act as a lid for selectively opening and covering the open front side of the receptacle.

9 Claims, 2 Drawing Sheets

CRASH HELMET STORAGE DEVICE FOR MOTORCYCLES

BACKGROUND OF THE INVENTION

1. Field of the Invention

The present invention relates to a crash helmet storage device for use in a riding-astride type motorcycle having a front cowl on a front portion of a motorcycle frame.

2. Description of the Relevant Art

Motorcycles of the riding-astride type having front cowls and crash helmet receptacles in and on motorcycle frames are disclosed in Japanese Laid-Open Utility Model Publication No. 59-192481 and French Utility Model Publication No. 2,397,315, for exampe. However, there has not been known any motorcycle which has a crash helmet receptacle in a front cowl.

SUMMARY OF THE INVENTION

According to the present invention, there is provided a crash helmet storage device in a riding-astride type motorcycle having a front cowl having a portion covering at least an area in front of a handlebar of the motorcycle, the crash helmet storage device comprising a receptacle disposed in the front cowl and having an open front side, a front cover serving as a component of the front cowl and positioned in front of the receptacle, and a pair of side covers serving as other components of the front cowl and covering lateral sides of the receptacle. The front cover is separate from the side covers and acts as a lid for selectively opening and covering the open front side of the receptacle.

With the arrangement of the present invention, the orientation and inclination of the engine of the motorcycle, the locations of various accessories such as a fuel tank and an air cleaner case can be determined relatively freely because the crash helmet storage device does not affect these design considerations.

Moreover, the crash helmet storage device does not impair the appearance of the motorcycle as it is fully covered with the front cowl.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
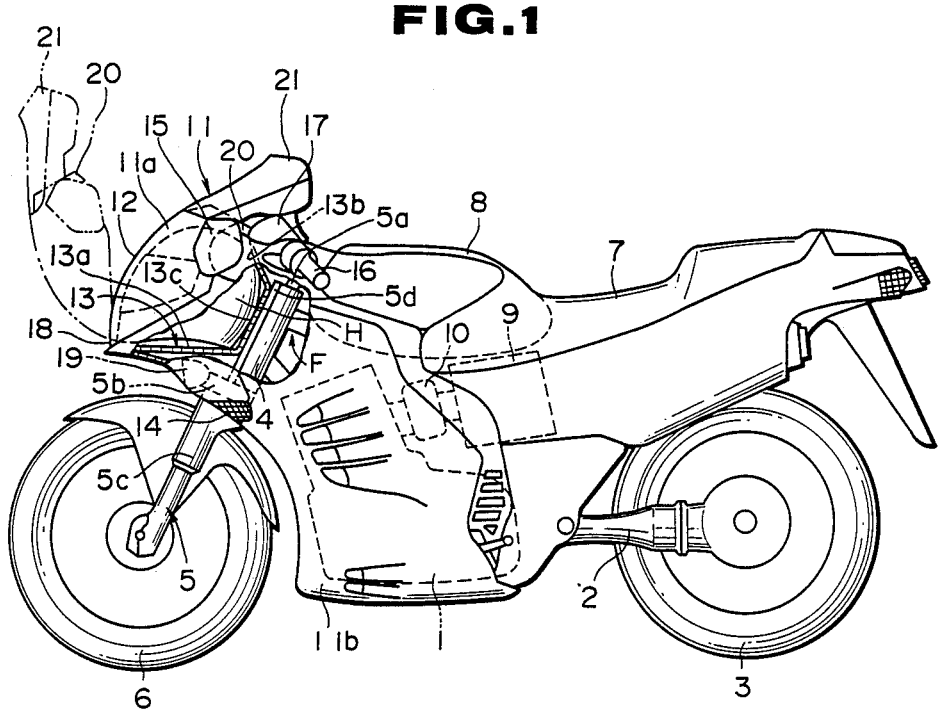
FIG. 1 is a side elevational view of a motorcycle having a crash helmet storage device according to a first embodiment of the present invention.

As shown in FIG. 1, a motorcycle includes a motorcycle frame F, partly illustrated, supporting an engine 1 on an intermediate lower portion thereof. The motorcycle frame F also supports a rear wheel 3 through a rear fork 2, which houses a drive shaft coupled to the engine 1 and supports a front wheel 6 on a head pipe 4 at the front end of the frame F through a front fork 5. A rider's seat 7 is mounted on a rear portion of the frame F, and a fuel tank 8 is also supported on the frame F in front of the rider's seat 7. An air cleaner case 9 and a carburetor 10 are disposed below the fuel tank 8.

A front cowl 11 is also mounted on the frame F in covering relation to the entire front motorcycle assembly ranging from the opposite sides of the engine 1 via the opposite sides of the head pipe 4 to a position in front of a handlebar 16. The front cowl 11 includes a portion 12 extending forwardly of the handlebar 16 and housing a receptacle 13 for storing a crash helmet H, the receptacle 13 having a front area opening in front of the front fork 5. The front cowl 11 comprises a front cover 11a on the front face of the forwardly extending portion 12, and a pair of side covers 11b extending rearwardly from the opposite sides of the front cover 11a. The front cover 11a has a lower end pivotally coupled to the front end of the bottom plate 13a of the receptacle 13 by means of a hinge 18. The front cover 11a is in the form of a lid for selectively opening and closing an open side 13b of the receptacle 13. The crash helmet H can be placed into and taken out of the receptacle 13 while the front cover 11a is in an open position, as indicated by the imaginary lines in FIG. 1.

Figure 2:
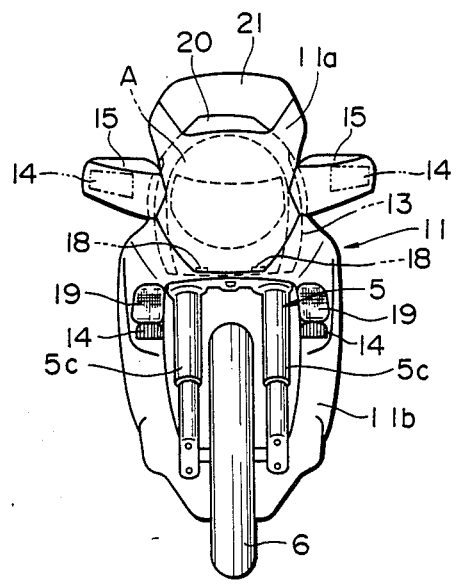
FIG. 2 is a front elevational view of the motorcycle shown in FIG. 1.

As shown in FIG. 2, a pair of headlights 19 is mounted on opposite sides of the side covers 11b below the receptacle 13 and a pair of blinkers or directional signal indicators 14 is mounted on the side covers 11b beneath the headlights 19. The blinkers 14 may instead be attached to the front surfaces of a pair of respective side rearview mirrors 15 as indicated by the imaginary lines in FIG. 2, the rearview mirrors 15 projecting laterally from the front cover 11a.

Figure 3:
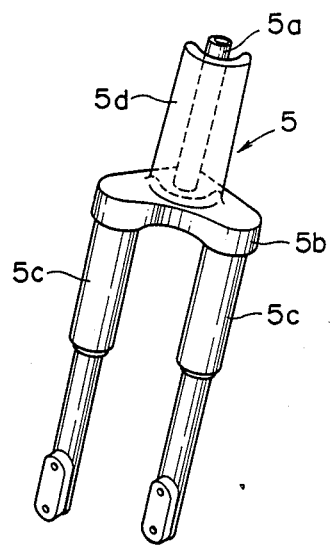
FIG. 3 is a perspective view of a front fork of the motorcycle of FIG. 1.

If the front fork 5 were of the double-bridge type, having a fork pipe extending between upper and lower bridges, then the fork pipe would tend to interfere with the receptacle 12 when the handlebar 16 is turned. To avoid this drawback, according to this embodiment, the front fork 5 is of the single-bridge type including, as shown in FIG. 3, a bridge 5b mounted on the lower end of a steering shaft 5a connected to the handlebar 16 and extending through and rotatably supported in the head pipe 4 and a pair of laterally spaced fork pipes 5c depending from the bridge 5b, the steering shaft 5a being displaced or offset rearwardly from the axes of the fork pipes 5c. The bottom plate 13a of the receptacle 13 is positioned higher than the bridge 5b. The receptacle 13 has a rear wall 13c positioned immediately in front of the sterring shaft 5a. The space in the front portion 12 of the front cowl 11 is thus employed as an installation space wherein the receptacle 13 is located, without physical interference with the fork pipes 5c. For increased rigidity of the front fork 5, the steering shaft 5a, the bridge 5b, and the fork pipes 5c are integrally cast as a unitary structure, or welded together into a unitary structure, and a stiffening member 5d is fixed to the upper surface of the bridge 5b in contact with an outer surface of the head pipe 4.

The motorcycle also includes an instrument assembly 17 mounted on the handlebar 16, a top panel 20 integrally formed with the front cover 11a in covering relation to the gap between the upper edge of the receptacle 13 and the instrument assembly 17, and a windshield 21.

Figure 4:
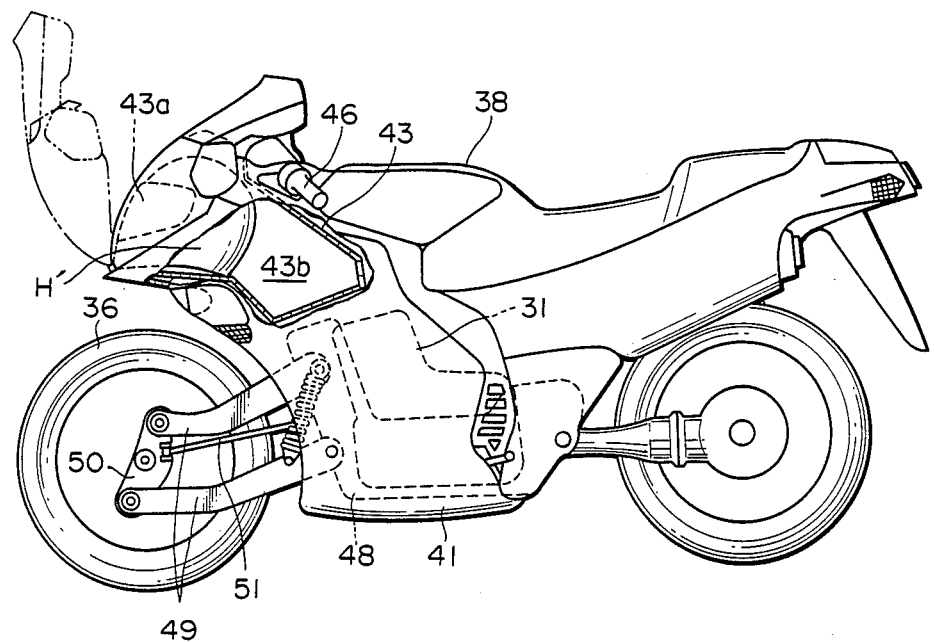
FIG. 4 is a side elevational view of another motorcycle incorporating a crash helmet storage device according to a second embodiment of the present invention.
Figure 5:
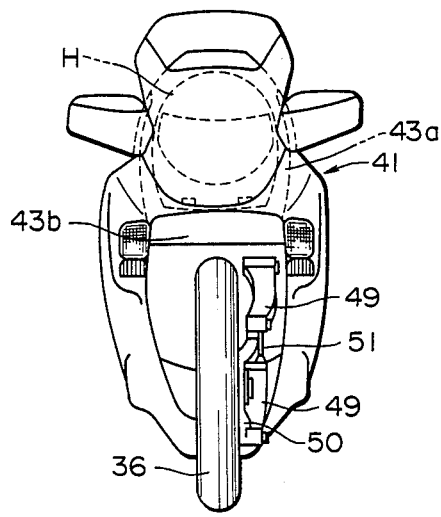
FIG. 5 is a front elevational view of the motorcycle shown in FIG. 4.

FIGS. 4 and 5 illustrate a crash helmet storage device according to a second embodiment of the present invention. A motorcycle incorporating the crash helmet storage device of the second embodiment includes a front wheel 36 rotatably supported on a knuckle arm 50 pivotally supported on the front ends of a pair of upper and lower swing arms 49 extending forwardly from a mount frame 48 on which an engine 31 is mounted. A handlebar 46 is pivotally supported on a stay (not shown) attached to a front end of a fuel tank 38. The front wheel 36 can be steered by the handlebar 46 through a tie rod 51 and the knuckle arm 50 coupled to the tie rod 51, the tie rod 51 being operatively connected to the handlebar 46 through an interlink mechanism (not shown). Since the illustrated motorcycle has no head pipe and no front fork, a receptacle 43 can be disposed in a front cowl 41 and extend downwardly and rearwardly from the handlebar 46. The receptacle 43 has therein a storage space 43a for storing a crash helmet H' and additionally a storage space 43b behind the storage space 43a for storing other articles.

Although there have been described what are at present considered to be the preferred embodiments of the prsent invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A crash helmet storage device in a riding-astride type motorcycle having an engine positioned at an intermediate portion of the vehicle and having at least a portion disposed forwardly of a rider's seat, a fuel tank positioned upwardly of the engine and forwardly of the rider's seat, and a front cowl at least partially covering the engine and having a portion covering at least an area in front of a handlebar of the motorcycle, said crash helmet storage device comprising:
   a receptacle disposed in said front cowl and having an open front side;
   the receptacle being disposed upwardly of the engine and forwardly of the fuel tank;
   a front cover serving as a component of said front cowl and positioned in front of said receptacle;
   a pair of side covers serving as other components of said front cowl and covering lateral sides of said receptacle; and
   said front cover being separate from said side covers and acting as a lid for selectively opening and covering said open front side of said receptacle.

2. A crash helmet storage device according to claim 1, wherein said front cover extends upwardly of said handlebar.

3. A crash helmet storage device according to claim 1, wherein said front cover has a windshield provided an upper end thereof.

4. A crash helmet storage device according to claim 1, wherein said receptacle is at least partially positioned in front of said handlebar.

5. A crash helmet storage device according to claim 1, wherein said motorcycle further includes a front wheel cover; and
   said front cowl is positioned above the front wheel cover.

6. A crash helmet storage device according to claim 1, wherein said front cover is pivotally mounted on front end of said receptacle.

7. A crash helmet storage device according to claim 1, wherein said motorcycle has a frame including a head pipe on a front end thereof, said handlebar being angularly movably supported on said head pipe for steering the motorcycle, and a front wheel steerably coupled through a front fork to said handlebar.

8. A crash helmet storage device according to claim 7, wherein said front fork comprises a steering shaft extending through said head pipe, a bridge mounted on a lower end of said steering shaft, and a pair of fork pipes depending from a lower surface of said bridge, said receptacle having a bottom plate positioned higher than said bridge.

9. A crash helmet storage device in a motorcycle having a front cowl having a portion covering at least an area in front of a handlebar of the motorcycle, said crash helmet storage device comprising:
   a receptacle disposed in said front cowl and having an open front side;
   a front cover serving as a component of said front cowl and positioned in front of said receptacle;
   a pair of side covers serving as other components of said front cowl and covering lateral sides of said receptacle;
   said front cover being separate from said side covers and acting as a lid for selectively opening and covering said open front side of said receptacle; and
   said motorcycle having an engine, a fuel tank with said handlebar being pivotally supported on a front end of said fuel tank, a front wheel rotatably supported on a pair of swing arms extending forward of said engine, and an interlink mechanism operatively interconnecting said front wheel and said handlebar for steering said front wheel in response to angular movement of said handlebar, said receptacle having therein a first storage space positioned in front of said handlebar and a second storage space positioned downwardly and rearwardly said handlebar.

* * * * *

UNITED STATES PATENT AND TRADEMARK OFFICE
CERTIFICATE OF CORRECTION

PATENT NO. : 4,895,284

DATED : January 23, 1990

INVENTOR(S) : Yoshio NOGAMI et al

It is certified that error appears in the above-identified patent and that said Letters Patent is hereby corrected as shown below:

Column 2, line 54, change sterring" to --steering--.

Column 3, line 27, change "prsent" to --present--.

Signed and Sealed this

Fifth Day of February, 1991

Attest:

HARRY F. MANBECK, JR.

*Attesting Officer*  *Commissioner of Patents and Trademarks*